(12) United States Patent
Bohin et al.

(10) Patent No.: US 6,511,754 B1
(45) Date of Patent: Jan. 28, 2003

(54) SILICONE COMPOSITION FOR COATING TEXTILE MATERIAL SUBSTRATES

(75) Inventors: Fabrice Bohin, Levallois Perret (FR); Alain Pouchelon, Meyzieu (FR); Christiane Prebet, Taluyers (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/869,152

(22) PCT Filed: Dec. 21, 1999

(86) PCT No.: PCT/FR99/03213

§ 371 (c)(1), (2), (4) Date: Sep. 26, 2001

(87) PCT Pub. No.: WO00/39208

PCT Pub. Date: Jul. 6, 2000

(30) Foreign Application Priority Data

Dec. 23, 1998 (FR) .............................. 98 16510

(51) Int. Cl.[7] ................................................ B32B 9/04
(52) U.S. Cl. ........................... 428/447; 528/15; 528/31; 442/164; 524/588; 523/212
(58) Field of Search .................. 523/212; 524/588; 528/15, 31; 442/164; 428/447

(56) References Cited

U.S. PATENT DOCUMENTS 5,364,921 A * 11/1994 Gray et al. ................... 528/15
5,658,674 A * 8/1997 Lorenzetti et al. .......... 428/447

FOREIGN PATENT DOCUMENTS

| EP | 0 240 163 A2 | 10/1987 |
| EP | 0 681 014 A1 | 11/1995 |
| GB | 2 287 248 A | 9/1995 |

* cited by examiner

Primary Examiner—Margaret G. Moore
(74) Attorney, Agent, or Firm—Burns, Doane, Swecker & Mathis, L.L.P.

(57) ABSTRACT

The invention concerns a method for preparing a cold-vulcanisable coating composition (CVE), and the resulting composition. The composition comprises a polyorganosiloxane with alkenyl groups bound to the silicium, a polyorganosiloxane with hydrogen atoms bound to the silicium, a catalyst, a ternary adhesion promoter consisting of an alkoxylated organosilane, an organosilicon compound comprising at least an epoxy radical, a chelate of metal and/or a metal alkoxide, a polyorganosiloxane called extender and having terminal siloxyl units with hydrogeno functions, and a reinforcing silicon filler treated in situ by a compatibility agent in the presence of polyorganosiloxane with alkenyl function, said in situ treatment consisting in preparing a filler suspension by bringing said silicon filler in the presence of the compatibility agent and polyorganosiloxane (1), thereby providing the in situ treatment of the filler. The invention further provides an elastomer with high extensibility.

29 Claims, No Drawings

SILICONE COMPOSITION FOR COATING TEXTILE MATERIAL SUBSTRATES

CROSS-REFERENCE

This application is the National Stage of International Application No. PCT/FR99/03213, filed Dec. 21, 1999, which was published by the International Bureau in French on Jun. 6, 2000. This application claims priority to French Application No. 98/16510, field Dec. 23, 1998.

The general field of the invention is that of cold-curing silicone compositions (but the curing of which is in general accelerated e.g. by heat), in particular those of the two-component type (RTV II), which crosslink by hydrosilylation or polyaddition in order to produce a thin-film elastomer. These crosslinked compositions are, among others, suitable as a coating, for example for protection or for mechanical reinforcement, on various substrates made of, in particular, textile material, such as woven, knitted or non-woven fibrous substrates, for example.

Such silicone coatings are generally obtained by coating the substrate, followed by curing, which proceeds by the polyaddition of unsaturated (alkenyl, e.g. Si-Vi) groups of one polyorganosiloxane onto hydrogen groups of another polyorganosiloxane.

These silicone compositions have found a major outlet in the coating of flexible—woven, knitted or non-woven—materials used for the manufacture of bags for the individual protection of the occupants of vehicles, also called "airbags".

For more details about airbags, reference may be made, in particular, to French Patent FR-A-2,668,106.

The present invention relates in particular, but not exclusively, to the application of the compositions according to the invention in the manufacture of such airbags.

Conventionally, the latter are formed from a fabric made of synthetic fibre, for example made of polyamide (nylon), covered on at least one of its sides with a layer of an elastomer of the chloroprene type. The presence of such a protective layer or coating is necessary because of the fact that the gases released by the gas generator (for example: carbon monoxide, $NO_x$) in the event of an impact are extremely hot and contain incandescent particles capable of damaging the nylon bag. The inner protective layer of elastomer must therefore be particularly resistant to high temperatures and to mechanical stresses. It is also important that this elastomer coating be in the form of a uniform thin film adhering strongly to the substrate made of synthetic fabric which forms the walls of the airbag.

In order to prevent the gases released by the gas generator from getting into the passenger compartment, it is important to ensure that the airbag exhibits good and constant impermeability. The elastomer coating must also allow this objective to be achieved, even when deposited in small amounts.

Another constraint which is imposed on the elastomer coating is that of the ageing behaviour, i.e. the retention of the thermal, mechanical and adhesion properties over time. This constraint is all the more acute since the airbags are stored in folded form in motor vehicles, before their possible life-saving expansion in the event of an accident.

As another criterion, one which is not negligible, it should be noted that the protective coating must not cause problems with regard to the manufacture, by stitching, of the airbag.

Silicone compositions have readily supplanted chloroprenes in this application since it has turned out that the latter do not satisfactorily meet all the specifications referred to above. There has been a diversification of silicone coating compositions and bags containing them in order to promote certain properties.

According to EP-A-0,553,840, known silicone compositions comprise:
- a polydiorganosiloxane having at least two alkenyl groups per molecule,
- a polyorganohydrogenosiloxane having at least two hydrogen atoms linked to the silicon in each molecule,
- a metal catalyst, the metal being of the platinum group,
- an adhesion promoter consisting of an epoxy-functional organosilicon compound,
- an inorganic filler, e.g. reinforcing fillers such as fumed titanium oxide, microparticulate silica, e.g. fumed silica, precipitated silica, pyrogenic silica, non-reinforcing fillers, such as quartz powder, diatomaceous earths, iron oxides, aluminium oxides, calcium carbonate or magnesium carbonate; e.g. a silica treated by an organosilane, an organosilazane or a diorganocyclopolysiloxane is incorporated,
- a polyorganosiloxane resin,
- and optionally a compound used as a crosslinking inhibitor.

In U.S. Pat. No. 5,296,298, the first six aforementioned constituents are again found but it should be noted that the adhesion promoter consists here of the combination of an epoxy-functional organosilicon compound with an alkoxylated silane containing, per molecule, a (meth)acryl or (meth)acryloxy group and, optionally, with an aluminium chelate, while the inorganic filler is given as being optional, although it (quartz or silica) is used in all the examples, 1 to 20, illustrating the invention. As examples of fillers, this document mentions fumed silica, precipitated silica, powdered quartz, diatomaceous earths and glass beads.

However, the aforementioned known silicone compositions suffer from the drawback of not adhering sufficiently well to the polyamide fabric of the bag in order to guarantee optimum reliability.

In EP-A-0,681,014 it was sought to obtain a silicone composition which can be applied in particular as an airbag inner coating and which, for this purpose, has more favourable properties in terms of, in particular, fire and temperature resistance, mechanical properties, ageing behaviour, adhesion and surface uniformity, the adhesion to substrates made of textile material being most particularly desirable. The solution proposed consisted in using:
a silicone coating composition of the type of those which are cold-curing (RTV) consisting of the mixture formed by:
  (I) at least one polyorganosiloxane having, per molecule, at least two $C_2$–$C_6$ alkenyl groups linked to the silicon,
  (II) at least one polyorganosiloxane having, per molecule, at least two hydrogen atoms linked to the silicon,
  (III) a catalytically effective amount of at least one catalyst, composed of at least one metal belonging to the platinum group,
  (IV) an adhesion promoter,
  (V) optionally a filler, preferably a mineral filler,
  (VI) optionally at least one crosslinking inhibitor
  (VII) and optionally at least one polyorganosiloxane resin,
in which the adhesion promoter consists exclusively of the at least ternary combination of the following ingredients:
  (IV.1) at least one alkoxylated organosilane containing, per molecule, at least one $C_2$–$C_6$ alkenyl group,
  (IV.2) at least one organosilicon compound which includes at least one epoxy radical,
  (IV.3) at least one metal M chelate and/or one metal alkoxide of general formula: $M(OJ)_n$, with n=the valency of M and J=a linear or branched $C_1$–$C_8$ alkyl, M being selected from the group formed by: Ti, Zr, Ge, Li, Mn, Fe, Al and Mg.

In EP-A-0,681,014, the mineral filler may fulfil the function of a reinforcing or semi-reinforcing filler. These reinforcing fillers may be chosen from colloidal silicas and pyrogenic and precipitated silica powders. These powders have a mean particle size of generally less than 0.1 µm and a BET specific surface area greater than 50 m²/g, preferably between 150 and 350 m²/g. The semi-reinforcing fillers may be diatomaceous earths or ground quartz, or else non-siliceous mineral substances generally having a particle size of between 0.001 and 300 µm and a BET specific surface area of less than 100 m²/g. Preferably, the filler is a mixture of quartz and silica.

These various inventors were preoccupied above all with improving the adhesion of silicone elastomers to substrates and with the fineness of the elastomeric layer.

The Applicant was given the objective of substantially improving the mechanical properties of these elastomers, most particularly the elongation at break or extensibility, without thereby compromising the other properties.

It is an object of the present invention especially to provide coating compositions resulting in elastomers whose extensibility is greater than or equal to 400%, and more particularly greater than or equal to 500%, measured according to the AFNOR T46002 standard.

The present invention relates to a process for preparing a coating composition of the type of those which are cold-curing (RTV), and the composition itself comprising:

(1) at least one polyorganosiloxane having, per molecule, at least two $C_2$–$C_6$ alkenyl groups linked to the silicon, (2) at least one polyorganosiloxane having, per molecule, at least two hydrogen atoms linked to the silicon, (3) a catalytically effective amount of at least one catalyst, based on at least one metal belonging to the platinum group, (4) a ternary adhesion promoter comprising
  (4.1) at least one possibly alkoxylated organosilane containing, per molecule, at least one $C_3$–$C_6$ alkenyl group,
  (4.2) at least one organosilicon compound which includes at least one epoxy radical,
  (4.3) at least one metal M chelate and/or one metal alkoxide of general formula: $M(OJ)_n$, with n=the valency of M and J=a linear or branched $C_1$–$C_8$ alkyl, M being selected from the group formed by: Ti, Zr, Ge, Li, Mn, Fe, Al and Mg, (5) a reinforcing siliceous filler treated in situ by a compatibilizer in the presence of polyorganosiloxane (1), (6) a polyorganosiloxane termed an extender and having terminal siloxyl units with hydrogeno functional groups, (7) optionally a neutralizer, (8) optionally a crosslinking inhibitor and/or one or more other additives used in this type of composition, (9) and optionally expanded or expandable inorganic hollow microspherical fillers.

The combination of a siliceous filler treated in situ with a polyorganosiloxane extender and with a ternary adhesion promoter which includes an organosiloxane having at least one $C_3$–$C_6$ alkenyl group, results in silicone coating compositions meeting the objectives of the invention and, most particularly, results in an elastomer having an extensibility of greater than or equal to 400% and preferably greater than or equal to 500%.

Preferably, the filler is a reinforcing filler. The use of a non-reinforcing filler is not excluded as a complement.

The reinforcing filler is preferably a siliceous filler.

The reinforcing siliceous fillers are chosen from colloidal silicas and pyrogenic and precipitated silica powders, or mixtures thereof.

These powders have a mean particle size generally close to or less than 0.1 µm and a BET specific surface area greater than 50 m²/g, preferably between 50 and 400 m²/g, especially between 150 and 350 m²/g.

Among complementary non-reinforcing fillers, mention may especially be made of diatomaceous earths and ground quartz.

Other complementary fillers are, for example, carbon black, titanium dioxide, aluminium oxide, hydrated alumina, expanded vermiculite, unexpanded vermiculite, calcium carbonate, zinc oxide, mica, talc, iron oxide, barium sulphate and slaked lime. These fillers generally have a particle size of between 0.001 and 300 µm and a BET surface area of less than 100 m²/g.

"In situ treatment of the siliceous filler" is understood to mean bringing the filler and the compatibilizer together in the presence of at least one portion of polyorganosiloxane silicone oil (1). More particularly preferably, this consists essentially in introducing the compatibilizer (C) in two stages into the preparation mixture:

on the one hand, before and/or more or less simultaneously with the contacting of at least some of the silicone oil employed with at least one portion of the siliceous filler used, this introduction of C (portion 1) taking place in one or more goes and corresponding to a proportion of less than or equal to 8%, preferably less than or equal to 5% and even more preferably less than or equal to 3%, by dry weight with respect to the total filler; and on the other hand (portion 2), after this silicone oil/filler contacting.

The compatibilizer of portion 1 is thus chosen from molecules which satisfy at least two criteria:

of having a strong interaction between the silica at its hydrogen bonds with itself and with the surrounding silicone oil;

of itself, or its degradation products, being readily removed from the final mixture by heating in a vacuum or in a gas stream, and the compounds of low molecular weight therefore being preferred.

The expression "overall equivalent quantity" is understood to mean that the order of magnitude of the molar quantities of C with respect to hydrogen bonds is respected.

The compatibilizer of portion 1 may, for example, be:

a silazane, preferably a disilazane, or mixtures thereof, hexamethyldisilazane (HMDZ) being the preferred silazane and possibly being combined with divinyltetramethyldisilazane;

a difunctional or preferably monofunctional hydroxylated siloxane;

an amine, such as aqueous ammonia or an alkylamine of low molecular weight, such as diethylamine;

an organic acid of low molecular weight, such as formic acid or acetic acid;

and is preferably employed in the presence of water.

The compatibilizers of portion 2 may be chosen from the various silazanes and disilazanes mentioned above, by themselves or as mixtures thereof, preferably from disilazanes, hexamethyldisilazane combined or not with divinyltetramethyldisilazane being particularly preferred.

More specifically, the method may consist:

in mixing:
- 100 parts by weight of silicone oil,
- 0 to 5 parts by weight of water,
- 20 to 80 parts by weight of filler consisting of silica,
- 1 to 20 parts by weight of compatibilizer;

in making the above react, preferably with stirring;

in heating the mixture obtained, choosing a pressure/temperature pair such that at least some of the water and of the volatile components are devolatilized;

if necessary, in cooling the mixture.

The mixing operation is carried out at a standard temperature and pressure and preferably in an inert atmosphere ($N_2$). Moreover, under these conditions the silicone oil and the water, but also the compatibilizer, should be in liquid form in order to facilitate mixing.

The siliceous reinforcing filler represents from 10 to 50% by weight of the suspension obtained. In practice, this filler is about 30±10%.

Advantageously, the proportion of compatibilizer introduced firstly is at most equal to 8% of the reinforcing filler (and, for example, between 1 and 3%, preferably between 1 and 2%, of the reinforcing filler). Moreover, it may be pointed out that the total amount of compatibilizer C is preferably between 5 and 30%, preferably between 10 and 20%, of the siliceous filler.

In order to define more specifically, without however this being limiting, the preferred method of implementing the compatibilizing process, it may be pointed out that this comprises the following steps:

- all or part of the silicone oil, the water and all or part of the siliceous filler are mixed, preferably in an atmosphere of inert gas (e.g. $N_2$), with a first portion of C of between 1 and 3% by dry weight with respect to the silica;
- a second portion of C, representing between 10 and 15% by dry weight of the silica, is incorporated into the mixture;
- optionally, the rest of the silicone oil and silica are added;
- the mixture is left to react, preferably while continuing the mixing;
- the mixture is devolatilized, preferably in an atmosphere of inert gas (e.g. $N_2$);
- optionally, the devolatilized mixture is left to cool; and
- optionally, the rest of the silicone oil is added to the suspension.

According to a first particular method of implementing the process, the latter comprises the following steps:

1. a mixture comprising the silicone oil, water and the first fraction of C—preferably HMDZ—is homogenized,
2. the particulate filler, preferably silica, is gradually added to the mixture obtained in 1,
3. the mixing is continued,
4. the second fraction of C—preferably HMDZ—is gradually incorporated into the mixture obtained in 3,
5. the mixing is continued,
6. the mixture is devolatilized, preferably by heating to a temperature $\geq 100°$ C., and preferably under reduced pressure or with a nitrogen purge.

In step 1 of this first method of implementation, one of the following three alternatives, among others, is chosen:
a) either all the oil and all the silica, together with the initial fraction of C, are used;
b) or all the oil, some of the silica and the initial fraction of C are used;
c) or all the silica, some of the oil and the initial fraction of C are used.

According to a second particular method of implementing the process, the latter comprises the following steps:

1'. the silicone oil and the water are homogenized,
2'. the particulate filler—preferably silica—and, simultaneously, the first fraction of C—preferably HMDZ—are gradually incorporated into the mixture obtained in 1',
3. the mixing is continued,
4. the second fraction of C—preferably HMDZ—is gradually incorporated into the mixture obtained in 3,
5. the mixing is continued,
6. the mixture is devolatilized, preferably by heating to a temperature $\geq 100°$ C.

The characteristic of this second method is linked to the fact that the process involves the co-addition of the particulate reinforcing filler and its compatibilizer. It is therefore possible to imagine premixing these two constituents or, alternatively, introducing them concomitantly. The gradual incorporation in step 2' may be carried out continuously or in stages.

According to a variant of this second method of implementation:

1". the silicone oil is introduced,
2". the particulate filler—preferably silica—the first fraction of C—preferably HMDZ—and water are gradually and simultaneously incorporated into the oil,
3. the mixing is continued,
4. the second fraction of C—preferably HMDZ—is gradually incorporated into the mixture obtained in 3,
5. the mixing is continued,
6. the mixture is devolatilized, preferably by heating to a temperature $\geq 100°$ C.

According to an advantageous version of the invention, corresponding to the case in which the reinforcing filler is silica and the compatibilizer C is HMDZ, an amount of HMDZ is used which is sufficient for the silica's surface content of $Si(Me)_3$ units to be $\geq 1$ $Si(Me)_3$ unit per $nm^2$ and preferably between 1 and 2 $Si(Me)_3$ units per $nm^2$.

As a variant, it is possible to use the compatibilizing methods of the prior art involving an early treatment with silazane (e.g. FR-A-2 320 324) or a late treatment (e.g. EP-A-462 032) knowing, however, that, depending on the silicas employed, their use will in general not allow the best results to be obtained in terms of mechanical properties, particularly the extensibility, obtained by a two-stage treatment according to the invention.

If the in situ treatment results in a basic pH, it is possible to add a neutralizer such as, for example, weak acids (e.g buffered acetic acid and phosphoric acid). It should be noted that this neutralization may be advantageously carried out by incorporating silica fillers such as ground quartz.

According to a preferred version of the invention, the alkoxylated organosilane (4.1) of the promoter (4) is more particularly selected from the products of the following general formula:

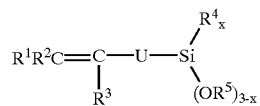

in which:
$R^1$, $R^2$ and $R^3$ are hydrogen or hydrocarbon radicals, which are identical or different, and represent, preferably, hydrogen, a linear or branched $C_1$–$C_4$ alkyl or a phenyl optionally substituted with at least one $C_1$–$C_3$ alkyl;

U is a linear or branched $C_1$–$C_4$ alkylene or a divalent group of formula —CO—O-alkylene-, where the alkylene residue is a linear or branched $C_1$–$C_4$ alkylene and the free valency on the right (in bold) is linked to the Si;

$R^4$ and $R^5$ are identical or different radicals and represent a linear or branched $C_1$–$C_4$ alkyl;

x=0 to 2, preferably 0 or 1 and even more preferably 0.

Mention may be made in particular of γ-methacryloxypropyltrimethoxysilane (MEMO).

According to the invention, the organosilicon compound (4.2) is chosen:

either from the substances (4.2a) satisfying the following general formula:

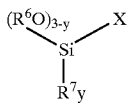
(4.2a)

in which:

$R^6$ is a linear or branched $C_1$–$C_4$ alkyl radical, $R^7$ is a linear or branched alkyl radical, y is equal to 0, 1, 2 or 3, preferably equal to 0 or 1 and even more preferably equal to 0,

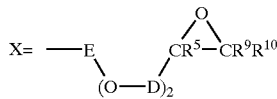

with

E and D, which are identical or different radicals, selected from linear or branched $C_1$–$C_4$ alkyls, z, which is equal to 0 or 1, $R^8$, $R^9$, $R^{10}$, which are identical or different radicals, representing hydrogen or a linear or branched $C_1$–$C_4$ alkyl, hydrogen being more particularly preferred, $R^8$ and $R^9$ or $R^{10}$, which may alternately constitute together, and with the two carbons containing the epoxy, a 5-membered to 7-membered alkyl ring, or from the substances (4.2b) consisting of epoxy-functional polydiorganosiloxanes comprising:

(i) at least one siloxyl unit of formula:

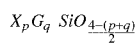
(IV.2 b₁)

in which:

X is the radical as defined above in the case of formula (IV.2a),

G is a monovalent hydrocarbon group, free of any action unfavourable to the activity of the catalyst and selected, preferably, from alkyl groups having from 1 to 8 carbon atoms inclusive, optionally substituted with at least one halogen atom, advantageously, from methyl, ethyl, propyl and 3,3,3-trifluoropropyl groups, and also from aryl groups, and, advantageously, from xylyl, tolyl and phenyl radicals, p=1 or 2,
q=0, 1 or 2,
p+q=1, 2 or 3, and (2i) optionally at least one siloxyl unit of formula:

(IV2 b₂)

in which G has the same meaning as above and r has a value of between 0 and 3, for example between 1 and 3.

The compounds (4.2) are preferably epoxyalkoxymonosilanes (IV.2a).

By way of such compounds (IV.2a), mention may be made of:

3-glycidoxypropyltrimethoxysilane (GLYMO), or
3,4-epoxycyclohexylethyltrimethoxysilane.

With regard to the essential final compound (4.3) of the adhesion promoter (4) of the silicone composition (RTV) according to the invention, the preferred substances are those in which the metal M is selected from the following list: Ti, Zr, Ge, Li, Mn. It should be emphasized that titanium is more particularly preferred. It may be combined, for example, with an alkoxy radical of the butoxy type.

According to the invention, one advantageous combination for forming the adhesion promoter is the following:

γ-methacryloxypropyltrimethoxysilane (MEMO)/3-glycidoxypropyltrimethoxysilane (GLYMO)/butyl titanate (TBOT=tetrabutyl orthotitanate).

Quantitatively, it may be specified that the weight proportions between (4.1), (4.2) and (4.3), expressed in percentages by weight with respect to the total of the three, are as follows:

(4.1) $\geq$10, preferably between 15 and 70 and even more preferably between 25 and 65, (4.2) $\leq$90, preferably between 70 and 15 and even more preferably between 65 and 25, (4.3) $\geq$1, preferably between 5 and 25 and even more preferably between 8 and 18, it being understood that the sum of these proportions of (4.1), (4.2) and (4.3) is equal to 100%.

The weight ratio (4.2):(4.1) is preferably between 2:1 and 0.5:1, the ration 1:1 being more particularly preferred.

Advantageously, the adhesion promoter is present in an amount of from 0.1 to 10, preferably 0.5 to 5 and even more preferably 1 to 3%, by weight with respect to all of the constituents of the composition.

The polyorganosiloxane extender (6) has terminal siloxyl units

with:

$R^0$, which are identical or different, corresponding to a substituted or unsubstituted aryl and/or linear or branched $C_1$–$C_6$ alkyl group, $R^0$ preferably being $CH_3$.

It should be noted that the rest of the molecule is a polydiorganosiloxane, preferably a polydimethylsiloxane.

By way of example, mention may be made of poly (dimethylsiloxy)-α,ω-(dimethylhydrogenosiloxy). By way of example of a commercial product that can be used as an extender, mention may be made of RHODORSIL® 620 H2 from Rhodia Chimie.

The polyorganosiloxane (1) is, weightwise, one of the main constituents of the composition according to the invention. Advantageously, this is a substance containing:

(i) siloxyl units of formula:

$$T_aZ_bSiO_{\frac{4-(a+b)}{2}} \quad (1.1)$$

in which:
T is an alkenyl group, preferably vinyl or allyl,
Z is a monovalent hydrocarbon group, free of any action unfavourable to the activity of the catalyst and selected, preferably, from alkyl groups having from 1 to 8 carbon atoms inclusive, optionally substituted with at least one halogen atom, advantageously, from methyl, ethyl, propyl and 3,3,3-trifluoropropyl groups and also from aryl groups and, advantageously, from xylyl, tolyl and phenyl radicals,
a is 1 or 2, b is 0, 1 or 2 and a+b is between 1 and 3, preferably between 2 and 3, and (2i) optionally other siloxyl units of formula:

$$Z_cSiO_{\frac{4-c}{2}} \quad (1.2)$$

in which Z has the same meaning as above and c has a value of between 0 and 3, preferably between 2 and 3.

It is advantageous for this polydiorganosiloxane to have a viscosity of between 200 and 10 000, especially between 500 and 5000 and preferably between 1000 and 2000 mPa·s.

Of course, in the case of a mixture of, several oils (1) of different viscosities, the viscosity of the mixture is taken into account.

All the viscosities involved in the present document correspond to a dynamic viscosity quantity which is measured, in a manner known per se, at 25° C.

The polyorganosiloxane (1) may be only formed from units of formula (1.1) or may contain, in addition, units of formula (1.2). Likewise, it may have a linear, branched, cyclic or network structure.

Z is generally selected from methyl, ethyl and phenyl radicals, 60 mol. % (or 60% by number) at least of the radicals Z being methyl radicals.

Examples of siloxyl units of formula (1.1) are the vinyldimethylsiloxyl unit, the vinylphenylmethylsiloxyl unit, the vinylmethylsiloxyl unit and the vinylsiloxyl unit.

Examples of siloxyl units of formula (1.2) are $SiO_{4/2}$, dimethylsiloxyl, methylphenylsiloxyl, diphenylsiloxyl, methylsiloxyl and phenylsiloxyl units.

Examples of polyorganosiloxanes (1) are linear and cyclic compounds such as: dimethylvinylsilyl-terminated dimethylpolysiloxanes, trimethylsilyl-terminated (methylvinyl)(dimethyl)polysiloxane copolymers, dimethylvinylsilyl-terminated (methylvinyl)(dimethyl)polysiloxane copolymers and cyclic methylvinylpolysiloxanes.

The polyorganosiloxane (2) is preferably of the type of those which comprise:
(i) siloxyl units of formula:

$$H_dL_eSiO_{\frac{4-(d+e)}{2}} \quad (2.1)$$

in which:
L is a monovalent hydrocarbon group, free of any action unfavourable to the activity of the catalyst and selected, preferably, from alkyl groups having from 1 to 8 carbon atoms inclusive, optionally substituted with at least one halogen atom, advantageously, from methyl, ethyl, propyl and 3,3,3-trifluoropropyl groups, and also from aryl groups, and, advantageously, from xylyl, tolyl and phenyl radicals,
d is 1 or 2, e is 0, 1 or 2, d+e has a value of between 1 and 3, preferably between 2 and 3, and (2i) optionally other siloxyl units of average formula:

$$L_gSiO_{\frac{4-g}{2}} \quad (2.2)$$

in which L has the same meaning as above and g has a value of between 0 and 3, preferably between 2 and 3.

The dynamic viscosity of this polyorganosiloxane (2) is at least equal to 10 mPa·s and preferably is between 20 and 1000 mPa·s.

The polyorganosiloxane (2) may be only formed from units of formula (2.1) or may contain, in addition, units of formula (2.2).

The polyorganosiloxane (2) may have a linear, branched, cyclic or network structure.

The group L has the same meaning as the group Z above.

Examples of units of formula (2.1) are:

$$H(CH_3)_2SiO_{1/2}, HCH_3SiO_{2/2}, H(C_6H_5)SiO_{2/2}$$

Examples of units of formula (2.2) are the same as those given above for the units of formula (1.2).

Examples of polyorganosiloxane (2) are linear and cyclic compounds such as:
hydrogenodimethylsilyl-terminated dimethylpolysiloxanes,
copolymers containing trimethylsilyl-terminated (dimethyl)(hydrogenomethyl)polysiloxane units,
copolymers containing hydrogenodimethylsilyl-terminated (dimethyl)(hydrogenomethyl)polysiloxane units,
trimethylsilyl-terminated hydrogenomethylpolysiloxanes, and
cyclic hydrogenomethylpolysiloxanes.

The ratio of the number of hydrogen atoms linked to the silicon in the polyorganosiloxane (2) to the total number of groups having alkenyl unsaturation in the polyorganosiloxane (1) is between 1 and 5, preferably between 1 and 2.

The catalysts (3) are also well known. Preferably, platinum and rhodium compounds are used. In particular, it is possible to use the complexes of platinum and of an organic substance described in Patents U.S. Pat. Nos. 3,159,601, 3,159,602, 3,220,972 and European Patents EP-A-0,057, 459, EP-A-0,188,978 and EP-A-0,190,530 and the complexes of platinum and of vinyl organosiloxanes described in Patents U.S. Pat. Nos. 3,419,593, 3,715,334, 3,377,432 and 3,814,730. The catalyst which is generally preferred is based on platinum. In this case, the amount by weight of catalyst (3), calculated in terms of the weight of platinum metal, is generally between 2 and 400 ppm, preferably between 5 and 50 ppm, these being based on the total weight of the polyorganosiloxanes (1) and (2).

Advantageously, the silicone composition according to the invention may also include at least one addition-reaction retarder (6) (crosslinking inhibitor) selected from the following compounds:
polyorganosiloxanes substituted with at least one alkenyl which may optionally be in cyclic form, tetramethylvinyltetrasiloxane being particularly preferred, pyridine,
organic phosphines and phosphites,
unsaturated amides,
alkyl maleates, and
acetylene alcohols.

These acetylene alcohols (cf. FR-B-1,528,464 and FR-A-2,372,874), which form part of the preferred thermal hydrosilylation-reaction blockers, have the formula:

in which formula:
R' is a linear or branched alkyl radical or a phenyl radical;
R" is H or a linear or branched alkyl radical or a phenyl radical, it being possible for the radicals R', R" and the carbon atom in the position with respect to the triple bond optionally to form a ring;
the total number of carbon atoms contained in R' and R" being at least 5, preferably from 9 to 20.

The said alcohols are preferably selected from those having a boiling point greater than 250° C. By way of examples, mention may be made of:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol; and
3-methyl-1-pentadecyn-3-ol.

These α-acetylene alcohols are commercially available products.

Such a retarder is present in an amount of at most 3000 ppm, preferably in an amount of from 100 to 2000 ppm with respect to the total weight of the organopolysiloxanes (1) and (2).

The microspherical fillers are preferably expandable organic microspheres comprising, as is known per se, a polymer wall containing a liquid or a gas. These microspheres are expanded by heating them above the softening point of the polymer and at a temperature high enough to vaporize the liquid or suitably expand the gas, which may for example be an alkane such as isobutane or isopentane. The wall may consist, as is known per se, of polymers or copolymers, for example those prepared from vinyl chloride, vinylidene chloride, acrylonitrile, methyl methacrylate or styrene monomers, or blends of polymers and/or copolymers, for example especially an acrylonitrile/methacrylonitrile copolymer or an acrylonitrile/vinylidene chloride copolymer. See for example U.S. Pat. No. 3,615,972.

It is possible to incorporate them into the composition either in the expanded state or before their expansion, which can be induced, by suitable heating, when crosslinking the composition.

It may be advantageous for the microspheres to be surface-treated, as is known per se, in order to make them easier to disperse in the composition; these may in particular be expandable or expanded microspheres having an inorganic coating, for example silica or salts or hydroxides of metals such as Ca, Mg, Ba, Fe, Zn, Ni and Mn, as is described, for example, in EP-A-486,080, or else carbonates, for example calcium carbonate.

As a preferred example, the microspheres sold under the name DUALITE® by UCB-Chemicals are used.

Before their expansion, the microspheres will preferably have a diameter of between 3 and 50 μm, more particularly between 5 and 30 μm.

It will also be desirable for the diameter after expansion (in situ or as supplied) to be between 10 and 150, particularly between 20 and 100 μm.

These microspheres will be present especially in an amount of from 1 to 30%, preferably 2 to 10%, by weight and more preferably more than 3 or 4% by weight with respect to the total composition.

In a manner known per se, one or more other conventional additives such as, for example, colorants, may be added to the silicone elastomer composition.

According to another of these aspects, the present invention relates to a two-component precursor system for the silicone composition described above. Such a precursor system is in the form of two separate parts A and B which are intended to be mixed in order to form the composition, one of these parts, A or B, containing the catalyst (3) and only one species (1) or (2) of polyorganoxosiloxane. Another characteristic of this precursor system is that its part A or B containing the polyorganosiloxane (2) does not contain compounds (4.3) of the promoter (4) and that its part A or B including the compound (4.1) of the promoter (4) does not contain the catalyst (3); the filler treated in situ is present in either or both parts A and B which contain the polyorganosiloxane (1).

Determination and optimization of the two parts A and B, in order to prevent bringing into contact, in one of the parts, species liable to react together, are within the usual capability of those skilled in the art.

The viscosity of the parts A and B and of their mixture can be adjusted by varying the amounts of the constituents and by choosing polyorganosiloxanes of different viscosity.

Once the parts A and B have been mixed together, they form a silicone composition (RTV II) ready to be used, which can be applied to the substrate by any suitable coating means (for example doctor blade, roll, screen printing, etc.). Although the crosslinking of the composition applied to the substrate to be coated can by definition be carried out cold (that is to say at a temperature close to room temperature= 23° C.), the compounds according to the invention are crosslinked by suitable means, especially by a thermal route and/or by electromagnetic radiation (electron beam) and/or infrared radiation.

The compositions according to the invention can be used especially for the covering or coating of woven, knitted or non-woven fibrous substrates, and preferably woven, knitted or non-woven substrates made of conventional or high-performance synthetic fibres, advantageously polyester or polyamide fibres, and glass fabrics.

The invention is aimed more particularly at the covering or coating of at least one of the sides (inside and/or outside) of the flexible substrate material (for example polyamide fabric) that can be used for the manufacture, by stitching, of airbags for individually protecting the occupants of vehicles in the event of an impact.

According to one specificity of the invention, these compositions are used to produce an extensible and impermeable elastomer layer on the outside of the airbags, especially in the absence of an internal coating when the mode of expansion of the bag and/or the composition of the latter so allow.

The subject of the present invention is also the use of a composition or of its precursor system as described above, for the covering or coating of fibrous substrates such as those described above.

The subject of the invention is. also such a fibrous substrate coated according to the invention and therefore able to exhibit the characteristics and properties indicated above.

The invention relates in particular to the covering or coating of at least one of the sides of the flexible substrate material (for example polyamide fabric) used for the manufacture, by stitching, of airbags for individually protecting the occupants of vehicles.

However, it should be clearly understood that the invention is not limited thereto and it can be employed in any application requiring similar properties.

In general, the coating involved here may correspond to the deposition of a single layer on at least one side of the flexible substrate material (primary coating). However, it is also possible to use it as one or more additional layers over or under other types of coating. Likewise, the application of more than one layer of the composition according to the invention is not excluded.

The present invention will now be described in greater detail with the aid of an embodiment and then by way of non-limiting example.

EXAMPLE

In this example, the viscosity was measured using a BROOKFIELD viscometer according to the information in the AFNOR NFT 76 106 standard of May 1982.

Introduced into a 100 l arm mixer were 40 kg of an α,ω-divinylated silicone oil of 1.5 Pa·s viscosity containing 0.1 meq of vinyl (Vi) per gram of oil, 0.24 kg of potable water and 0.24 kg of hexamethyldisilazane. After homogenization, 13.9 kg of a pyrogenic silica characterized by its 200 $m^2$/g specific surface area were added in portions over about 2 hours. After approximately 1 hour of mixing, 2.27 kg of hexamethyldisilazane were added over about 1 hour. 2 hours later, a heating phase was started, during which the mixture was placed in a stream of nitrogen (30 $m^3$/h); the heating continued until a temperature of approximately 140° C. was reached, which temperature was held for 2 hours so as to remove the volatile matter from the composition. The suspension was then left to cool.

Starting from this suspension, a part A and a part B were formulated in suitable reactors.

Part A contained:

320 g of the suspension;

111 g of an α,ω-divinylated oil of 100 Pa·s viscosity containing 0.03 meq Vi per gram of oil;

35 g of ground quartz having a mean particle size ($d_{50}$) close to 2.5 μm;

12 g of a polyhydrogeno oil of 0.3 Pa·s viscosity containing 1.6 meq SiH per gram of oil;

12 g of an α,ω-dihydrogeno oil containing 1.9 meq SiH per gram of oil;

5 g of γ-methacryloxypropyltrimethoxysilane 5 g of γ-glycidoxypropyltrimethoxysilane; and 0.7 g of ethynylcyclohexanol.

Part B contained:

480 g of the suspension;

20 g of butyl orthotitanate; and 1.1 g of a Karstedt catalyst containing 10% platinum.

The parts A and B were mixed in the ratio of 100 to 10 and, after degassing, the test specimens needed for measuring the mechanical properties and the adhesion properties were prepared.

Properties

The good ageing resistance of the composition was checked by verifying, by means of a Brookfield-type needle viscometer, that its viscosity did not vary greatly after a period of one week in a hermetically sealed container placed in an oven maintained at 70° C.

To characterize the performance of the elastomer, the following were measured:

on the one hand, the tensile properties of a specimen plaque 2 mm in thickness of the elastmer compression-moulded at 150° C. and crosslinked under these conditions in 1 hour. The corresponding measurements relate to the AFNOR T 46002 (tensile strength and elongation at break), ASTM D 624A (tear strength) and DIN 53505 (hardness) standards;

on the other hand, the adhesion properties of this elastomer by measuring its adhesion to a polyamide fabric. To do this, a thin coating of the elastomer of about 50 μm on a nylon-6,6 fabric characterized by its 235 dtex linear density was prepared; the fabric was then crosslinked in 2 minutes at 160° C. After cooling, strips of this assembly 50 mm in width were subjected to a scrub test according to the NF G 37110 and ISO S 9812RN standards. The number of scrubs that the coating could undergo before it was damaged (appearance of delamination) was therefore noted.

Viscosity in Pa·s before/after the ageing test: 45/53 Pa·s

Shore A hardness: 24

Elongation at break: 610%

Tensile strength: 5.9 MPa

Tear strength: 16 N/mm

Number of scrubs without any damage: >600.

As indicated by these values, the composition exhibits good ageing resistance, the elastomer has good tensile properties and adheres strongly to its substrate fabric. In particular, its remarkable ability to be extended and to resist tearing enable it to withstand the stresses and strains to which the fabric is subjected during its use.

Although the invention has been described in detail and with one particular embodiment, it goes without saying that, for a person skilled in the art, variants and modifications may be made without departing either from the scope or the spirit of the invention.

What is claimed is:

1. Process for preparing a coating composition of the type which are cold-curing (RTV), and the composition itself comprising:

(1) at least one polyorganosiloxane having, per molecule, at least two $C_2$–$C_6$ alkenyl groups linked to the silicon, (2) at least one polyorganosiloxane having, per molecule, at least two hydrogen atoms linked to the silicon, (3) a catalytically effective amount of at least one catalyst, composed of at least one metal belonging to the platinum group, (4) a ternary adhesion promoter comprising (4.1) at least one alkoxylated organosilane containing, per molecule, at least one $C_3$–$C_6$ alkenyl group, (4.2) at least one organosilicon compound which includes at least one epoxy radical, (4.3) at least one metal M chelate and/or one metal alkoxide of general formula:

M(OJ)$_n$, with n=the valency of M and J=a linear or branched $C_1$–$C_8$ alkyl, M being selected from the group consisting of: Ti, Zr, Ge, Li, Mn, Fe, Al and Mg, (5) a reinforcing siliceous filler treated in situ by a compatibilizer in the presence of polyorganosiloxane (1), (6) a polyorganosiloxane termed an extender and having terminal siloxyl units with hydrogeno functional groups, (7) optionally a neutralizer, (8) optionally a crosslinking inhibitor and/or one or more other additives used in this type of composition, (9) and optionally expanded or expandable inorganic hollow microspherical fillers, said in situ treatment of the filler comprising the steps of introducing the compatibilizer in two stages into a preparation mixture containing reinforcing siliceous filler and polyorganosiloxane (1):

(stage 1) on the one hand, before or simultaneously with the contacting of at least some of the polyorganosiloxane employed with at least one portion of the siliceous filler used, this introduction of compatibilizer taking place in one or more increments and corresponding to a proportion of less than or equal to 8% by dry weight with respect to the total filler; and (stage 2) on the other hand, adding the remaining portion of compatibilizer after the above polyorganosiloxane contacting.

2. Process according to claim 1, wherein said in situ treatment essentially consists of:

in mixing:
100 parts by weight of polyorganosiloxane (1),
0 to 5 parts by weight of water,
20 to 80 parts by weight of filler consisting of silica,
1 to 20 parts by weight of compatibilizer;

in making the above react, optionally with stirring;

in heating the mixture obtained, choosing a pressure/temperature pair such that at least some of the water and of the volatile components are devolatilized;

optionally cooling the mixture.

3. Process according to claim 1, wherein:

all or part of the polyorganosiloxane (1), the water and all or part of the siliceous filler are mixed, optionally in an atmosphere of inert gas, with a first portion of compatibilizer of between 1 and 3% by dry weight with respect to the silica;

a second portion of compatibilizer, representing between 10 and 15% by dry weight of the silica, is incorporated into the mixture;

optionally, the rest of the polyorganosiloxane and silica are added;

the mixture is left to react, optionally while continuing the mixing;

the mixture is devolatilized, optionally in an atmosphere of inert gas;

optionally, the devolatilized mixture is left to cool; and optionally, the rest of the polyorganosiloxane is added to the suspension.

4. Process according to claim 1, wherein the compatibilizer is chosen from silazanes and mixtures thereof.

5. Process according to claim 1, wherein the compatibilizer is chosen from the group consisting of:

a silazane or mixtures thereof;
a difunctional or monofunctional hydroxylated siloxane;
an amine; and
an organic acid of low molecular weight.

6. A process according to claim 1, wherein the proportion of compatibilizer in stage 1 is less than or equal to 5% by dry weight with respect to total filler.

7. A process according to claim 6, wherein said proportion of compatibilizer is less than or equal to 3% by weight.

8. A process according to claim 4, wherein the compatibilizer comprises a disilazane.

9. A process according to claim 8, wherein the compatibilizer comprises hexamethyldisilazane or a mixture thereof with divinyltetramethyldisilazane.

10. A process according to claim 5, wherein the compatibilizer comprises a disilazane.

11. A process according to claim 10, wherein the compatibilizer comprises hexamethyldisilazane or a mixture thereof with divinyltetramethyldisilazane.

12. A process according to claim 5, wherein said amine comprises aqueous ammonia or an alkylamine.

13. A process according to claim 12, wherein the alkylamine comprises diethylamine.

14. A process according to claim 5, wherein the organic acid comprises formic or acetic acid.

15. Coating composition of the type which are cold-curing (RTV), obtained by the process according to claim 1 comprising:

(1) at least one polyorganosiloxane having, per molecule, at least two $C_2$–$C_6$ alkenyl groups linked to the silicon, (2) at least one polyorganosiloxane having, per molecule, at least two hydrogen atoms linked to the silicon, (3) a catalytically effective amount of at least one catalyst, composed of at least one metal belonging to the platinum group, (4) a ternary adhesion promoter comprising
(4.1) at least one alkoxylated organosilane containing, per molecule, at least one $C_3$–$C_6$ alkenyl group,
(4.2) at least one organosilicon compound which includes at least one epoxy radical,
(4.3) at least one metal M chelate and/or one metal alkoxide of general formula: $M(OJ)_n$, with n=the valency of M and J=a linear or branched $C_1$–$C_8$ alkyl, M being selected from the group consisting of: Ti, Zr, Ge, Li, Mn, Fe, Al and Mg,

(10) a reinforcing siliceous filler treated in situ by a compatibilizer in the presence of polyorganosiloxane (1),

(11) a polyorganosiloxane termed an extender-and having terminal siloxyl units with hydrogen functional groups,

(12) optionally, a neutralizer,

(13) optionally, a crosslinking inhabiter and/or one or more other additives used in this type of composition, and

(14) optionally, expanded or expandable inorganic hollow microspherical fillers.

16. Composition according to claim 15, wherein the alkoxylated organosilane (4.1) of the promoter (4) satisfies the following general formula:

$$R^1R^2C=\underset{R^3}{C}-U-Si\underset{(OR^5)_{3-x}}{\overset{R^4{}_x}{\diagup\diagdown}}$$

in which:

$R^1$, $R^2$ and $R^3$ are hydrogen or hydrocarbon radicals, which are identical or different, and represent hydrogen, a linear or branched $C_1$–$C_4$ alkyl or a phenyl optionally substituted with at least one $C_1$–$C_3$ alkyl;

U is a linear or branched $C_1$–$C_4$ alkylene or a divalent group of formula —CO—O-alkylene-, where the alkylene residue is a linear or branched $C_1$–$C_4$ alkylene and is linked directly to the Si;

$R^4$ and $R^5$ are identical or different radicals and represent a linear or branched $C_1$–$C_4$ alkyl;

x=0 to 2.

17. Composition according to claim 15, wherein the organosilicon compound (4.2) of the promoter (4) is chosen:
either from the substances (4.2a) satisfying the following general formula:
in which:

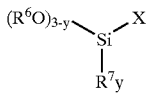
(4.2a)

$R^6$ is a linear or branched $C_1$–$C_4$ alkyl radical,
$R^7$ is a linear or branched alkyl radical,
y is equal to 0, 1, 2 or 3,

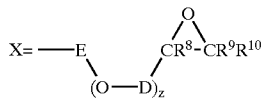

with
E and D, which are identical or different radicals, selected from linear or branched $C_1$–$C_4$ alkyls,
z, which is equal to 0 or 1,
$R^8$, $R^9$, $R^{10}$, which are identical or different radicals, representing hydrogen or a linear or branched $C_1$–$C_4$ alkyl,
$R^8$ and $R^9$ or $R^{10}$, which may alternately constitute together, and with the two carbons containing the epoxy, a 5-membered to 7-membered alkyl ring,
or from the substances (4.2b) consisting of epoxy-functional polydiorganosiloxanes comprising:
(i) at least one siloxyl unit of formula:

$$X_pG_pSiO\frac{4-(p+q)}{2} \quad (4.2b_1)$$

in which:
X is the radical as defined above in the case of formula (4.2a),
G is a monovalent hydrocarbon group, free of any action unfavourable to the activity of the catalyst and selected from alkyl groups having from 1 to 8 carbon atoms inclusive, optionally substituted by at least one halogen atom, and also from aryl groups,
p=1 or 2,
q=0, 1 or 2,
p+q=1, 2 or 3,
and (ii) optionally at least one siloxyl unit of formula:

$$G_rSiO\frac{4-r}{2} \quad (IV.2b_2)$$

in which G has the same meaning as above and r has a value of between 0 and 3.

18. Composition according to claim 15, wherein the metal M of the chelate and/or of the alkoxide (4.3) is chosen from the group consisting of: Ti, Zr, Ge, Li and Mn.

19. Composition according to claim 15, wherein the adhesion promoter is present in an amount of from 0.1 to 10% by weight with respect to the entire composition.

20. Composition according to claim 15, wherein the polyorganosiloxane (1) has:

(i) siloxyl units of formula:

$$T_aZ_bSiO\frac{4-(a+b)}{2} \quad (1.1)$$

in which:
T is an alkenyl group,
Z is a monovalent hydrocarbon group, free of any action unfavourable to the activity of the catalyst and selected from the group consisting of alkyl groups having from 1 to 8 carbon atoms inclusive, optionally substituted with at least one halogen atom, and aryl groups,
a is 1 or 2, b is 0, 1 or 2 and a+b is between 1 and 3,
and (ii) optionally other siloxyl units of formula:

$$Z_cSiO\frac{4-c}{2} \quad (1.2)$$

in which Z has the same meaning as above and c has a value of between 0 and 3.

21. Composition according to claim 15, wherein the polyorganosiloxane (2) comprises:
(i) siloxyl units of formula:

$$H_dL_eSiO\frac{4-(d+e)}{2} \quad (2.1)$$

in which:
L is a monovalent hydrocarbon group, free of any action unfavourable to the activity of the catalyst and selected from the group consisting of alkyl groups having from 1 to 8 carbon atoms inclusive, optionally 5 substituted with at least one halogen atom, and aryl groups,
d is 1 or 2, e is 0, 1 or 2, d+e has a value of between 1 and 3,
and (ii) optionally other siloxyl units of average formula:

$$L_gSiO\frac{4-g}{2} \quad (2.2)$$

in which L has the same meaning as above and g has a value of between 0 and 3.

22. Composition according to claim 15, wherein the polyorganosiloxane (1) has a viscosity of between 200 and 10000 mPa·s measured at 25° C.

23. Composition according to claim 15, wherein the polyorganosiloxane extender (6) has terminal siloxyl units $$HR_2^0SiO_{1/2}$$

with
$R^0$, which are identical or different, corresponding to a substituted or unsubstituted aryl and/or linear or branched $C_1$–$C_6$ alkyl group.

24. Composition according to claim 15, wherein the neutralizer (7) is a silica filler.

25. Composition according to claim 15, wherein the adhesion promoter (4) comprises at least the following compounds:

(4.1) γ-methacryloxypropyltrimethoxysilane;
(4.2) 3-glycidoxypropyltrimethoxysilane;
(4.3) butyl titanate.

26. Two-component precursor system for the composition according to claim 15, comprising:
   two separate parts A and B which are intended to be mixed in order to form the composition,
   one of parts A and B contains the catalyst (3) and only one species (1) or (2) of polyorganosiloxane,
   the part A or B containing the polyorganosiloxane (2) does not contain compound (4.3) of the promoter (4) and the part A or B including the compound (4.1) of the promoter (4) does not contain the catalyst (3), and the filler treated in situ is present in either or both parts A and B which contain the polyorganosiloxane (1).

27. Woven, knitted or non-woven fibrous substrate coated on one or two sides with a two-component system according to claim 26.

28. Woven, knitted or non-woven fibrous substrate coated on one or two sides with a composition according to claim 15.

29. Airbag for protecting an occupant of a vehicle, formed from a fabric coated according to claim 28.

* * * * *